W. H. BARNES.
TRUCK FOR HANDLING BRICK AND LIKE MATERIAL.
APPLICATION FILED FEB. 24, 1914.
1,130,243.
Patented Mar. 2, 1915.
5 SHEETS—SHEET 5.
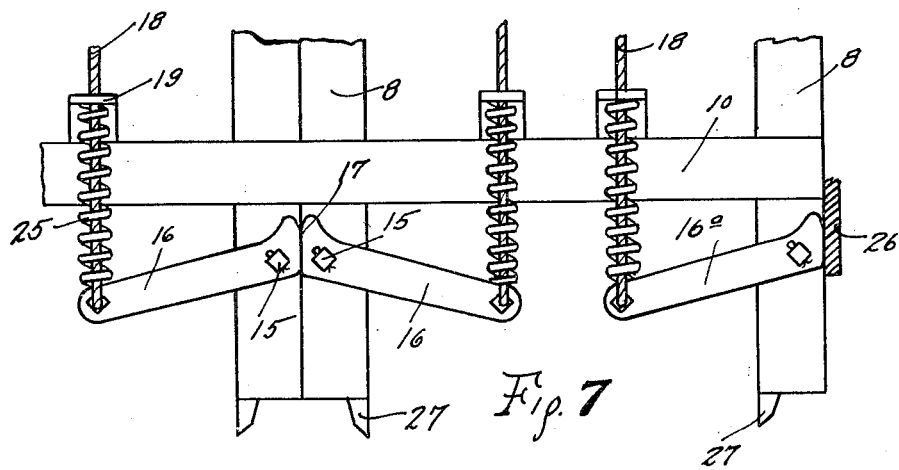
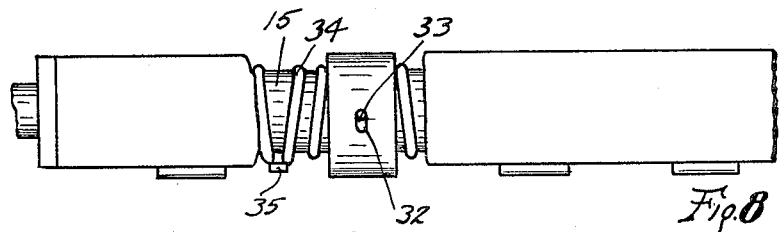
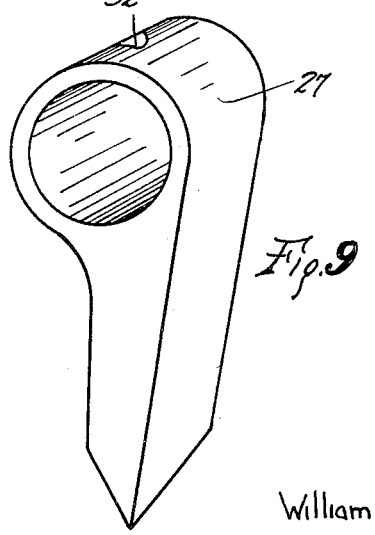
Inventor
William Henry Barnes
Witnesses

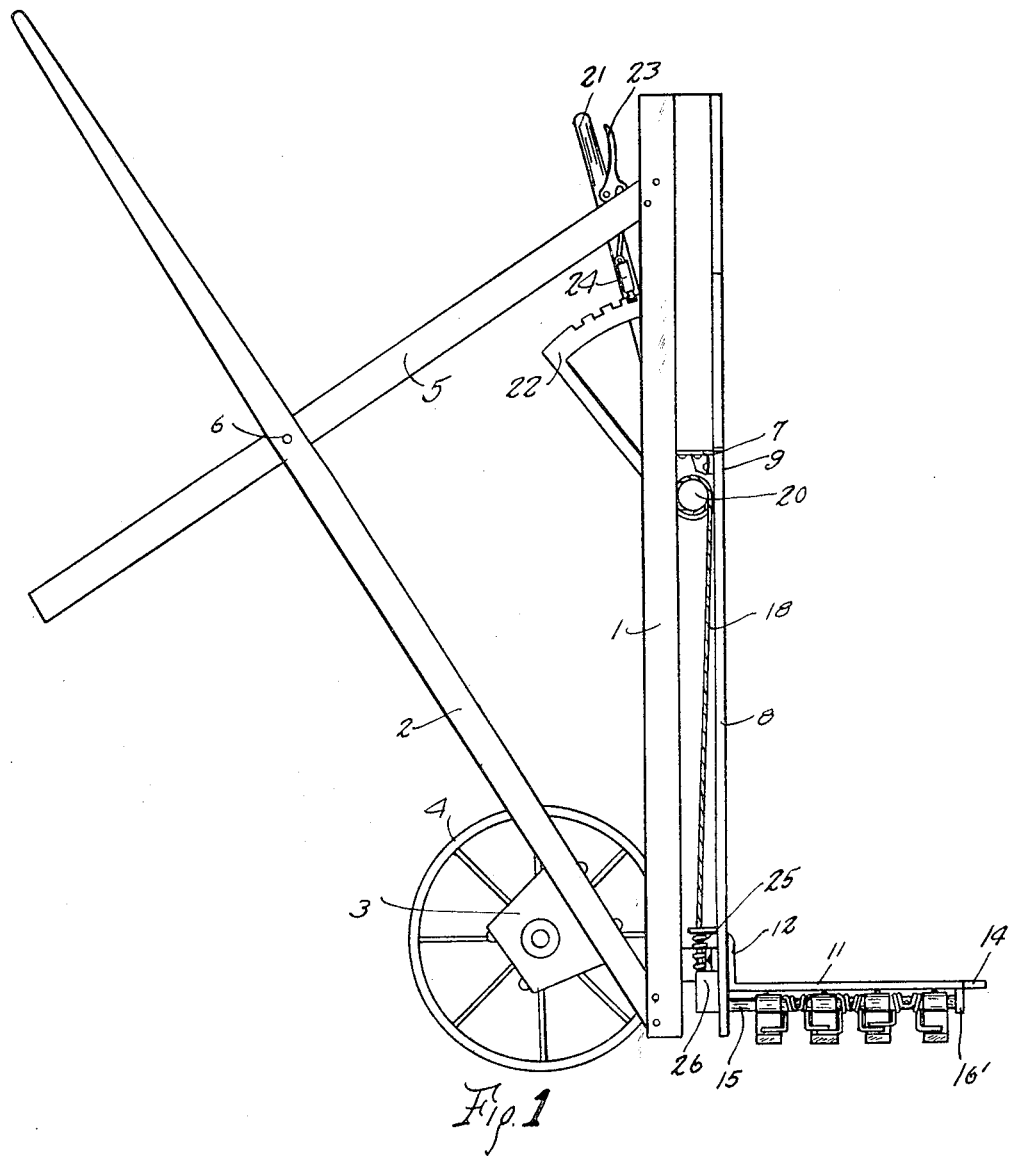

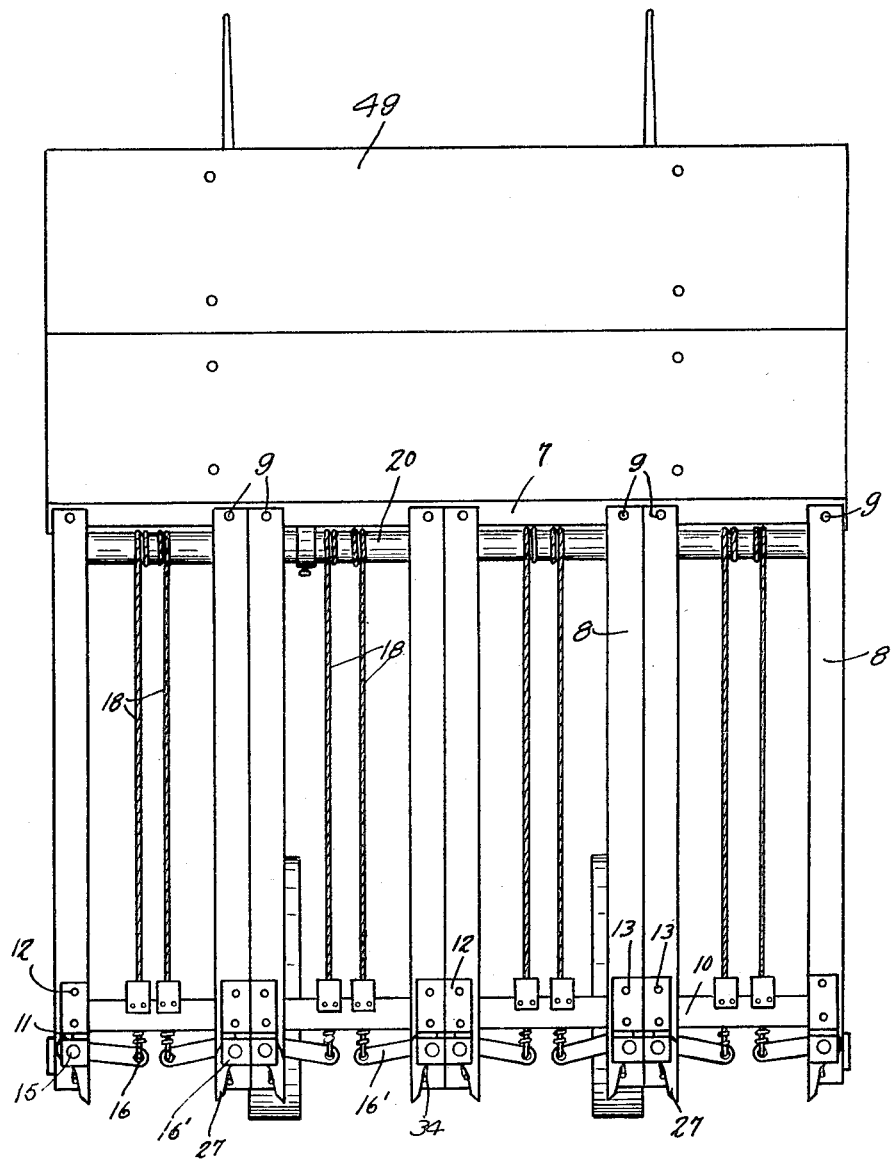

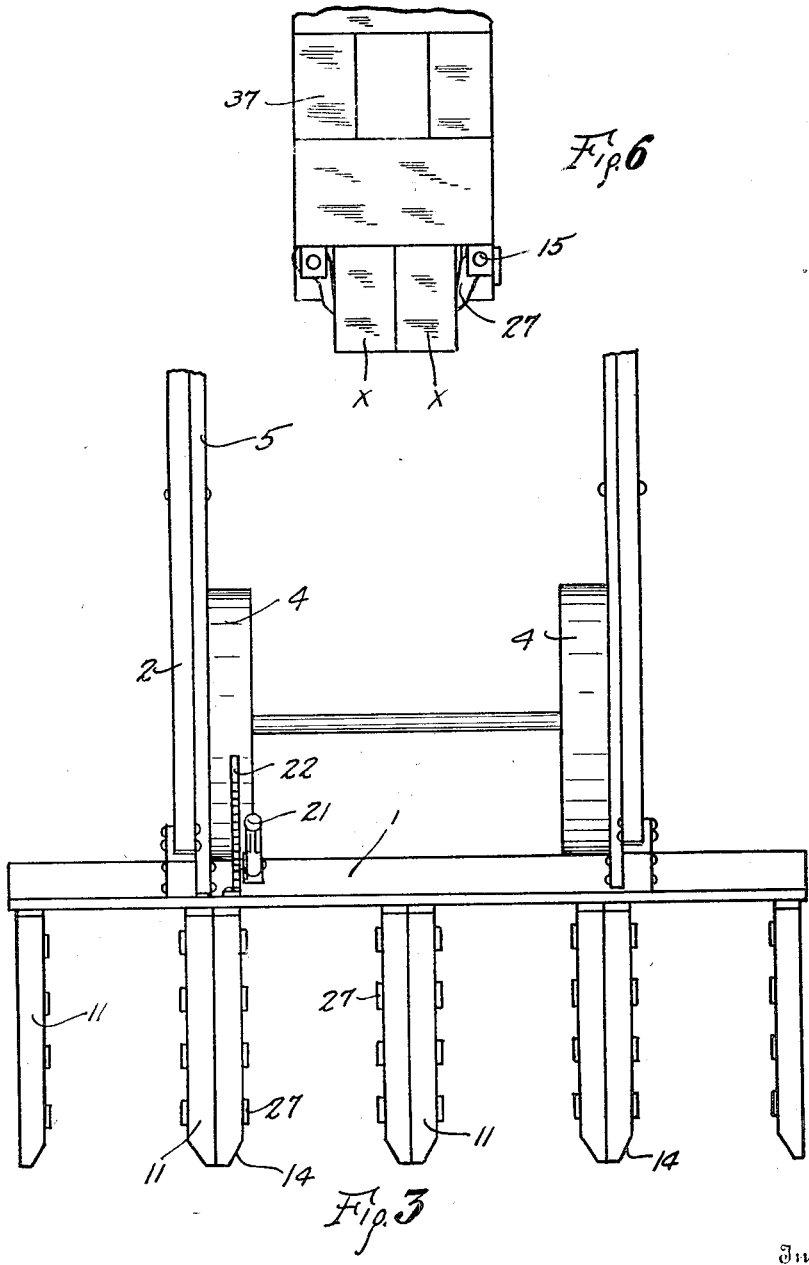

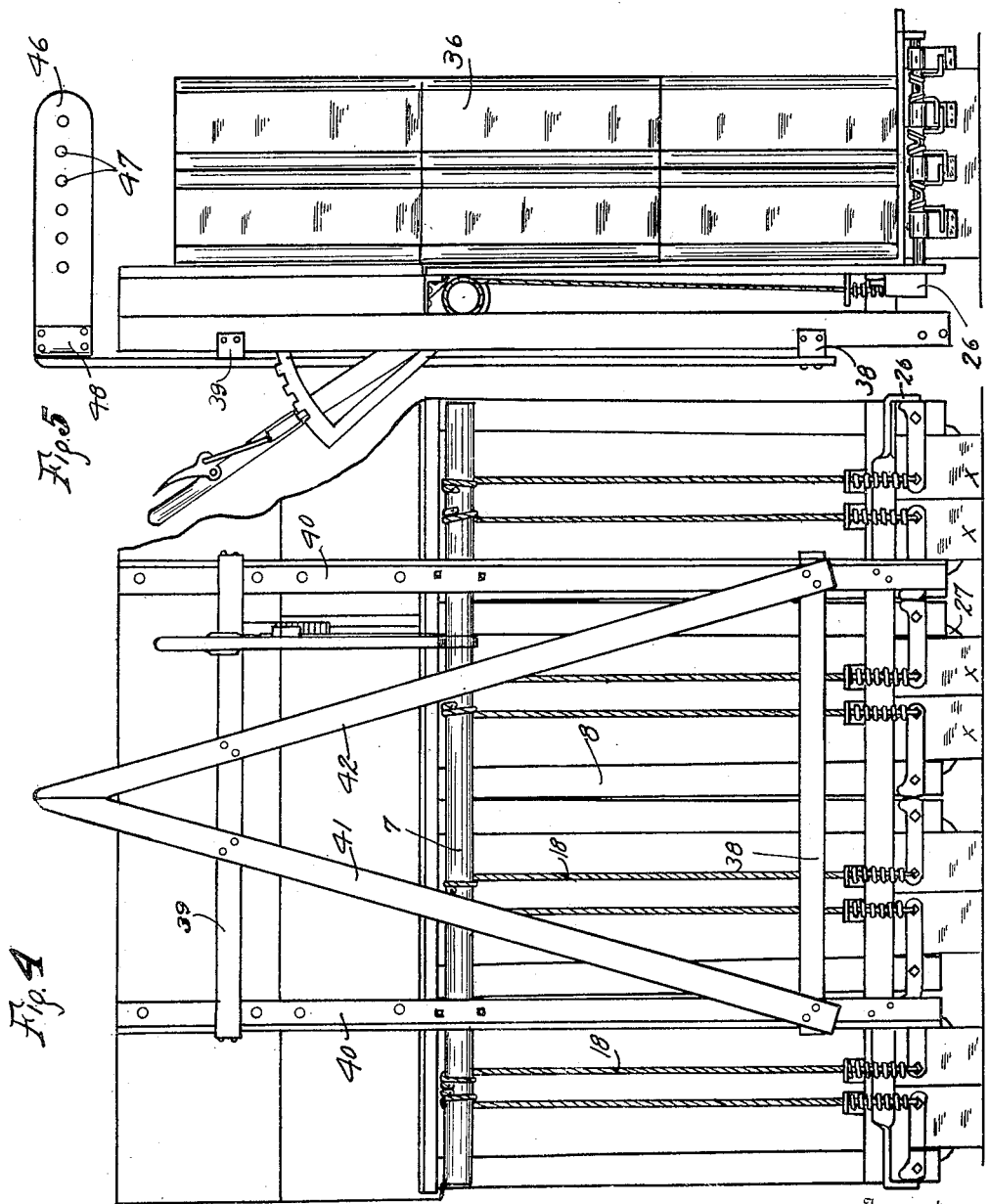

UNITED STATES PATENT OFFICE.

WILLIAM HENRY BARNES, OF SPOKANE, WASHINGTON.

TRUCK FOR HANDLING BRICK AND LIKE MATERIAL.

1,130,243.

Specification of Letters Patent. Patented Mar. 2, 1915.

Application filed February 24, 1914. Serial No. 820,704.

*To all whom it may concern:*

Be it known that I, WILLIAM HENRY BARNES, a citizen of the United States, residing at Spokane, in the county of Spokane and State of Washington, have invented new and useful Improvements in Trucks for Handling Bricks and like Material, of which the following is a specification.

My invention relates to an improvement in trucks for handling bricks or like material, and has as its principal object a device which may be used interchangeable in transporting bricks or in setting the kilns.

A second object is to design a truck in which the load is evenly balanced over the wheels.

A third object is to provide improved gripping devices on brick handling trucks.

A final object resides in the particular arrangement and combination of parts hereinafter described.

In the accompanying drawings: Figure 1 shows the truck in side elevation embodying my improvements. Fig. 2 is a front elevation of the truck shown in Fig. 1. Fig. 3 is a plan view of the truck shown in Fig. 1. Fig. 4 is a rear plan view of my invention, having wheels removed and base secured for use in setting the kilns. Fig. 5 is a side elevation of the device as arranged in Fig. 4, the wheels and handles being removed. Fig. 6 is a detail showing the arrangement of a stack of bricks about to be lifted by my truck. Fig. 7 is a detail of the mechanism used for grasping the bricks and the means for operating the same, looking from the rear of the machine. Fig. 8 is a detail view of one of the iron straps used to support the weight of the bricks, parts being broken away. Fig. 9 is a detail view of a gripping finger.

In the separate views the same part is designated by the same reference character.

Referring more particularly to the drawings, 1 is a frame, attached to the rear of which is a pair of bars such as 2 serving as handles and also providing means for supporting the brackets 3 in which the wheels 4 are journaled. It will be clearly seen from Fig. 1 that the bars 2 are attached to the frame 1 at one end thereof and make an angle of somewhat less than 45 degrees therewith. The bars 5 are attached to the frame 1 near the end opposite the connection with the bars 2, and extend in the rear of the frame, crossing the bars 2 approximately at right angles thereto being attached to them at the point 6. The bars 5 and 2 serve as a brace for the frame and the bars 5 also serve as a support when the truck is not in motion.

The frame 1 is provided with an angle iron 7, appearing in Figs. 1 and 2, which extends horizontally transversely of the frame 1, and to which are pivoted the members 8 at points 9. It will be seen from Figs. 1 and 2 that the members 8 are relatively long flat bars and extend to the lower end of the frame 1. At the lower end of the frame is a cross bar 10 parallel to bar 7, which serves to support the lower ends of the members 8 but to which they are not attached. The members 8 carry at their lower ends the outwardly extending bars 11 which are best shown in Figs. 1 and 3, the members 11 being provided with portions 12 offset at right angles thereto and which rest against the front face of the members 10 and are attached thereto by rivets such as 13, or other suitable means. At their forward ends the members 11 are beveled as shown at 14 in order to facilitate the introduction of the members 11 between piles of bricks.

The members 8 project somewhat beyond their point of connection with the members 11 and immediately below the members 11, the members 8 have pivoted therein the shafts or rods 15, the forward ends of which are journaled in downwardly projecting brackets 16' which are attached to the under faces of the members 11. The rear ends of the shafts 15, as best shown in Fig. 7, are squared and carry levers such as 16. It will be seen from the drawings that the members 8, and consequently the shafts 15 are mounted in pairs, the members of each pair being alongside of each other. Consequently I arrange the members 16 so as to extend in opposite directions from each pair of members 8, and extend the levers 16 toward adjacent edges so that the levers belonging to the members of each pair of bars 8 come into contact as indicated at 17, these contacting faces being adapted to act as operating cams. The outer ends of the levers 16 are attached to ropes 18 which pass through brackets 19 attached to the cross bar 10 and are fastened at their upper ends to a horizontal operating shaft 20, best shown in Figs. 1 and 2. I provide a handle 21 which is rigidly attached to the shaft 20 for operating the same, and a notch segment 22 is also provided which extends parallel to the path of movement of the lever 21. The handle or lever 21 also carries a grip 23 which is operatively connected with a catch 24, the latter being designed to engage the notches of the segment 22 in order to retain the handle in any position to which it is turned until released by the operation of the grip 23.

From the foregoing it will be seen that when the handle 21 is pulled toward the left as shown in Fig. 1, the shaft 20 will be revolved and consequently the ropes 18 will be wound up pulling on the levers 16, and it will also be seen from the shape of the levers 16 at the ends opposite said points of attachment to the ropes 18, that when thus operated the levers 16, and consequently the members 8, will be forced apart. Springs 25 are provided beneath the brackets 19 which are adapted to return the levers 16 to the position shown in Fig. 7 when tension on the ropes 18 has been released.

Referring to Figs. 4 and 5 it will be seen, however, that the members 8 along the two outer edges of the device are mounted singly and consequently I provide forwardly projecting bars 26 which extend parallel to the outer shafts 15 and against which the corresponding levers 16ª may push when the ropes 18 are placed under tension.

Carried by the shafts 15 are gripping fingers 27 which are provided with integral collars through which the shafts extend. The collar portions of the fingers 27 are provided with slots 32 through which extend pins 33 carried by shaft 15. I also provide springs 34 which, at their centers, are held by set screws such as 35 and which are wrapped oppositely around the shafts 15. The springs 34 are attached at their ends to the fingers 27 and are adapted to hold the same normally forward in the direction in which they are turned when the shafts 15 are turned by the levers 16. When, however, the fingers 27 have been operated by the levers 16 to grasp the lower tier *x x* of a stack of bricks such as 37, the springs 34 and slots 32 permit the fingers 27 to yield sufficiently to accommodate themselves to any inequalities on the bricks.

In case it is desired to handle tile with my truck it is only necessary that bricks corresponding to *x x* be inserted to afford a gripping surface for the fingers 27 whereupon the truck may be loaded up with tile such as 36, shown in Fig. 5. It will be seen, moreover, that if desired, the members 11 might be extended to accommodate twice as large a load. It will also be noted that Fig. 4 shows the levers 16 and fingers 27 in the position which they assume when grasping a stack of bricks or the idler bricks used under a stack of tile.

In case it is desired to use the truck as a setting machine, the wheels and handles are removed and cross bars 38 and 39 are bent so as to fit on the outside of the angle irons 40 which form the vertically extending portions of the frame 1. The cross bars 38 and 39 serve to support the strap irons 41 and 42 which are suitably bolted to the bars 38 and 39 and are inclined toward one another so as to form a triangle with the lower cross bar 38, the vertex of the triangle being somewhat above the upper end of the frame 1. At its upper end, the member 41 is bent forwardly to form an arm such as 46 which extends parallel to the members 11. The arms 46 are perforated as shown at 47 which are adapted to accommodate a hook or pulley so that the machine may be handled by a train or travel along a tramway. It will be understood that member 42 is bent and bolted to member 41 at the point 48 which is the vertex of the triangle before mentioned.

It will be seen from the foregoing description that in the use of my device, bricks are piled as shown in Fig. 6 leaving room between the separate piles for the insertion of the members 11, these members being beveled at their ends as shown at 14 to facilitate their insertion between the piles. The handle 21 is then pulled down so as to operate the fingers 27 in order to grip the bricks as previously described, whereupon the bricks may be transported. It will be seen that a deck 49 is fastened to the frame 1 above the cross bar 7 to support the bricks or tile if it is desired to pile them above the upper ends of the members 8.

It will be understood that while I have shown and described the preferred form of my invention, various mechanical equivalents may be substituted for the parts shown and described herein, and that parts of my invention may be utilized without using the whole.

Having thus described my invention, what I claim is:—

1. In a truck for handling bricks and the like in combination, a frame, members pivoted to said frame and extending substantially parallel thereto, supporting members fixed to said first mentioned members and extending forwardly from said frame, rods pivotally mounted beneath said supporting members, grasping fingers mounted on said rods, and means for turning said first mentioned members whereby said grasping fingers are brought into operative engagement with objects to be transported, said means comprising levers rigid with said shafts and extending parallel to the planes of said first mentioned members, said levers being arranged in pairs, the levers of each pair being arranged in contact at one end and having cam-like surfaces at their points of contact, the opposite ends of said levers from said cam surfaces being connected to flexible members, and means for tensioning said flexible members.

2. In a truck for handling bricks and the like in combination, a frame, members pivoted to said frame and arranged to move in a plane substantially parallel thereto, supporting members fixed to said first mentioned members and extending substantially at right angles thereto, shafts pivotally supported by said members and extending parallel to said supporting members underneath said supporting members, grasping fingers yieldably connected to said shafts, levers fixed to shafts, said levers being arranged in pairs and provided with cam-like surfaces, the cam surfaces of the levers of each pair being in contact and the ends of said levers removed from said cam surface being perforated, flexible members attached to the perforated ends of said levers, a shaft to which said flexible members are connected, an operating lever connected to said shaft, a notched segment, and releasable means for engaging said lever with said segment.

In testimony whereof I affix my signature in the presence of two witnesses.

WILLIAM HENRY BARNES.

Witnesses:
HAROLD SCANTLEBURY,
EDNA BROYLES.

Copies of this patent may be obtained for five cents each, by addressing the "Commissioner of Patents. Washington, D. C."